Jan. 23, 1968 R. GERMANN 3,364,735

SWITCHING ARRANGEMENT FOR THE DETERMINATION OF THE INDICATED OUTPUT OF AN ENGINE

Filed Dec. 8, 1965 2 Sheets-Sheet 1

Inventor
Reimar Germann
By
Watson, Cole, Grindle & Watson
Attys.

$L_i = A_1 - A_2 - A_3 - A_4$ $L_2 = A_2 - A_3$ $L_1 = A_1 - A_4$ $L_i = A_1 - A_4 - (A_2 - A_3)$ $L_i = A_1 - A_4 - A_2 - A_3$

Inventor
Reimar Germann
By
Watson, Cole, Grindle & Watson
Attys.

United States Patent Office 3,364,735
Patented Jan. 23, 1968

3,364,735

SWITCHING ARRANGEMENT FOR THE DETERMINATION OF THE INDICATED OUTPUT OF AN ENGINE

Reimar Germann, Graz, Austria, assignor to Hans List, Graz, Austria

Filed Dec. 8, 1965, Ser. No. 512,296
Claims priority, application Austria, Jan. 25, 1965, A 576/65
5 Claims. (Cl. 73—117)

ABSTRACT OF THE DISCLOSURE

A switching arrangement to determine the output of a piston-type power engine including a pressure pick-up with an amplifier following the pick-up and a voltage comparator having two inputs. The first input consists of a circuit section controlled as a function of travel and an electromagnetic pulse pick-up. The arrangement also includes an amplitude limiter stage and a monostable stage together with an integrator supplying a voltage with a cutoff, the arrangement further including a generator and a circuit section controlling a counting device and comprises additional elements. The arrangement also includes various stages for the shifting register and a switch to follow the reducer stage.

Figure 1:
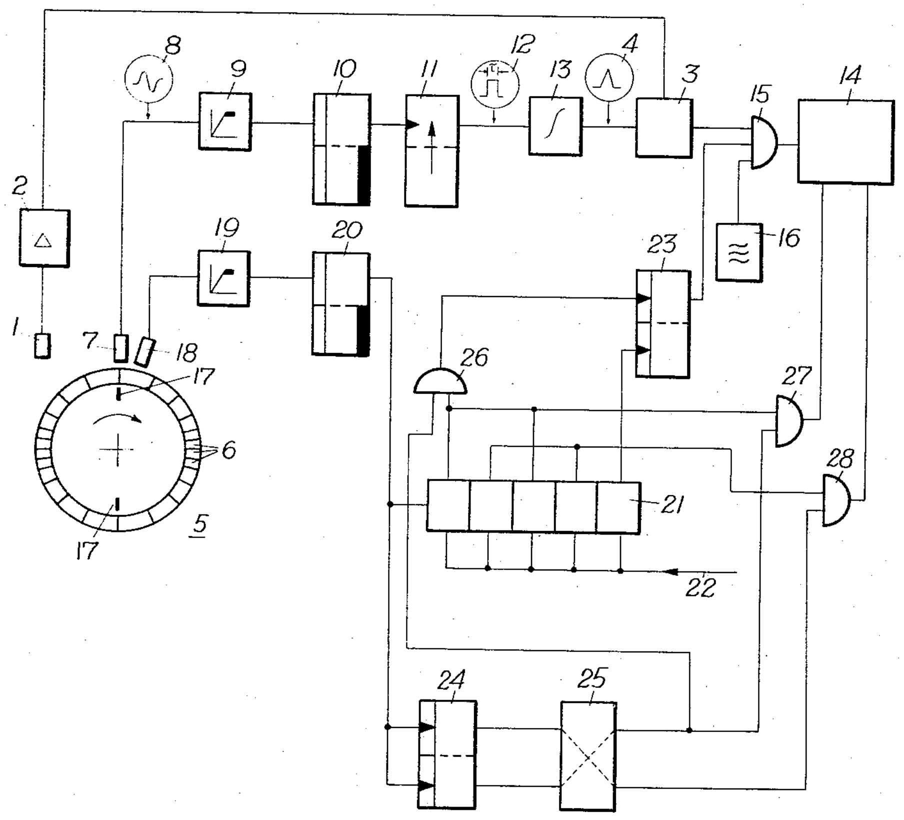

The invention relates to a switching arrangement for the determination of the indicated output of an engine, particularly of piston-type power engines by integration of the area included in the pressure-and-travel curve. As a rule, the indicated output, e.g., of piston-type power engines, is determined by the plotting and subsequent analysis of the ps-diagram by means of the integration of the area enclosed by the diagram curve in accordance with any of the conventional methods, such as counting, weighing, planimetry etc. Frequently, however, the accuracy of the values thus obtained leaves much to be desired and in addition, these methods are relatively cumbersome and involve considerable loss of time. On the other hand, with conventional electronic processes the difficulty generally resides in the recording of the associated pressure and travel values and in the method of integration used, as a result of which determination of output with non-recurrent cycles is often found to be practically impossible.

The invention eliminates these drawbacks of conventional methods by the provision of a switching arrangement which makes it possible to determine the indicated output for one or several cycles by electronic means. This switching arrangement is characterized by the fact that a conventional voltage comparator is followed by a counting device via a gate to the second input of which a generator is connected for the supply of counting pulses of constant frequency, a preferably piezo-electric pressure pick-up releasing voltage in proportion to the pressure via an amplifier to one of the inputs of the voltage comparator, whereas an electromagnetic pulse pick-up actuated in a manner known per se by means of ferromagnetic laminae mounted on a rotary element of the engine at intervals which are proportionate to the piston travel releases via an amplitude limiter stage, a pulse shaper stage, a monostable stage (single-shot multivibrator) and an integrator, a saw-tooth voltage featuring a cut-off which is proportionate to the piston travel as the standard voltage to the second input of the voltage comparator, a counting device control circuitry being furthermore provided comprising a second pulse pick-up actuated by means of ferromagnetic laminae mounted on the rotary element in accordance with the dead-center position of the engine, the said second pulse pick-up being followed by a limiter stage, the latter being in turn followed by a pulse-shaper stage controlling a shifting register and a reducer stage, the first and third stages of the shifting register comprising a minimum of five stages being connected via a first AND-gate with the left-hand input of a bistable flip-flop circuit controlling the said gate on the one hand, and via a second AND-gate with the input for forward counting of the counting device on the other hand, the second and fourth stages of the shifting register being connected via a third AND-gate with the input for inverse counting of the counting device, the last stage of the shifting register controlling the right-hand input of the bistable flip-flop circuit, the reducer stage being followed by a self-positioning switch the left-hand output of which is connected with the first and second AND-gates, whereas its right-hand output is connected with the third AND-gate. By using hardware of the type required for the indication of the engine anyway, the amount of materials needed for this switching arrangement can be considerably reduced. From a functional viewpoint, the operation of the switching arrangement is similar to that of the numerical integration process insofar as the area inclosed in the curve is divided into stripes as a function of travel, its mean amplitudes being determined by means of saw-tooth pulses in accordance with a conventional voltage comparison method and totalized or subtracted, as the case may be, by the digital process. Instead of the cumbersome plotting of diagrams, the desired result can be read on the counting device immediately after the measurement which may cover either one or several cycles. Besides, exclusive use of electronic means ensures a high degree of accuracy of the results of measurements.

According to another embodiment of the invention, the counting device comprises two counters, one of them being connected to the second AND-gate and the other to the third AND-gate, the output of the gate being connected with the input of both the second and the third AND-gate. This simplified arrangement should preferably be used in the absence of a forward-and-inverse counting counter. Of the two counters provided in its place one totalizes all positive and the other all negative area sections. In order to arrive at the final measurand, the results of the two counters require merely subsequent subtraction.

According to a further feature of the invention, the outputs of the first and third stages of the five-stage shifting register are also connected with the outputs of the remaining odd-numbered stages except for the last, whereas the outputs of the remaining even-numbered stages are connected with the outputs of the second and fourth stages. Thus the measuring process may be extended over several revolutions with the need for additional counting of the number of revolutions and for dividing the result by the number of revolutions. This process provides the mean value of several revolutions of the engine.

With all types of switching arrangements it is advisable to place the pressure curve so far into the negative area that positive pressure values only will be available for the pressure pick-up. There is no objection to doing this because repeated additions or subtractions of the measurands are not liable to produce errors, provided only that the zero level remains the same for the duration of the measurements.

Figure 2:
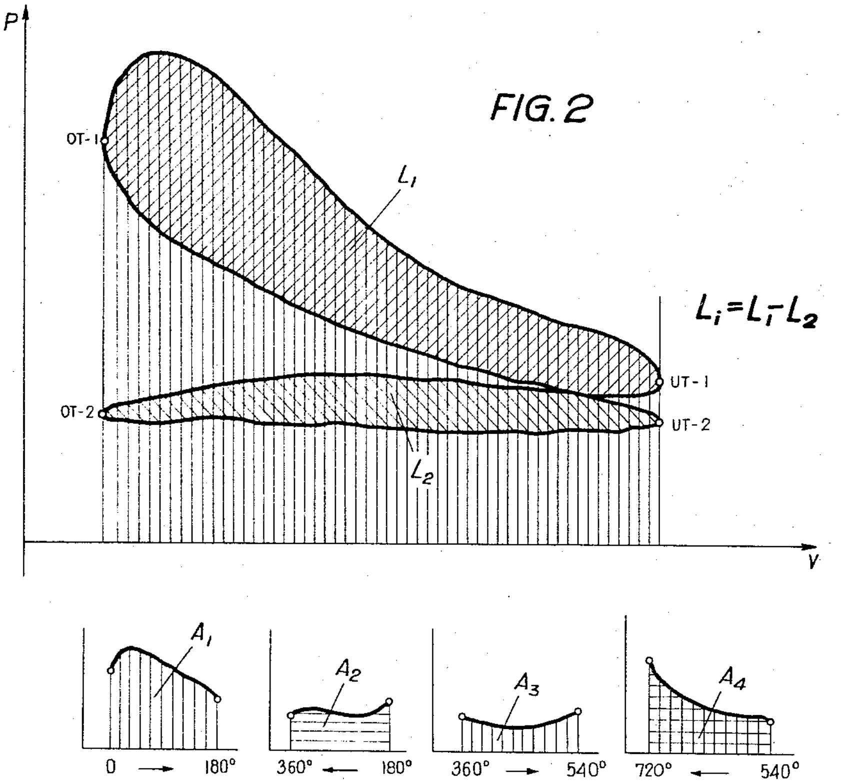
Figure 3:
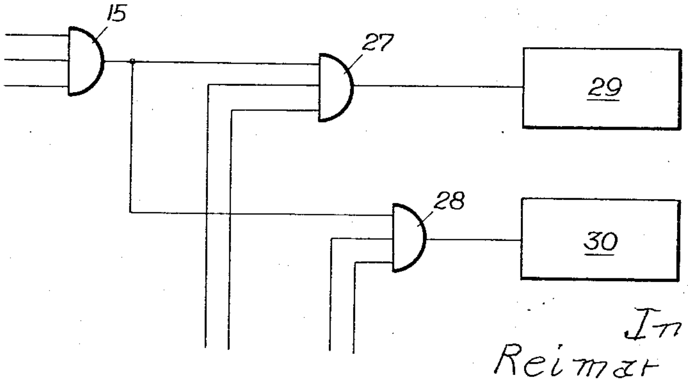

Further details of the invention will be hereafter described with reference to the accompanying drawing in which FIG. 1 schematically illustrates a preferred embodiment of the invention, FIG. 2 shows a pressure-travel diagram of a piston-type power engine, and FIG. 3 is a circuit section of another embodiment of the invention featuring a different switching arrangement.

Pressure is recorded in a manner known per se by the piezo-electric method by means of a quartz pressure pick-up 1 followed by a charge amplifier 2 supplying voltage proportionate to the prevailing pressure to one of the inputs of a voltage comparator 3. There the said voltage is compared with a saw-tooth voltage 4 in a manner known per se. The circuit section serving to produce this saw-tooth voltage 4 comprises an electro-magnetic pulse pick-up 7 energized in a manner known per se by passing ferromagnetic laminae 6 located on the circumference of a disk 5 made of some anti-magnetic material and mounted on the shaft of the engine to be tested, the said laminae being arranged at intervals which are proportionate to the piston travel, furthermore an amplitude-limiter stage 9 for the pulses 8 supplied by the pulse pick-up, the said amplitude-limiter stage 9 being followed by a pulse-shaper stage 10 which in turn controls a monostable stage or single-shot multivibrator 11. The latter transmits at its output square-wave pulses 12 of a constant pulse width $\tau$ which are integrated in the following integrator 13. Consequently, saw-tooth impulses 4 featuring a constant rise time and a cut-off which is proportionate to the piston travel will appear at the second input of the voltage comparator 3, which means that saw-tooth impulses 4 appear only if and when one of the ferromagnetic laminae 6 pass the pulse pick-up 7.

Consequently, rectangular pulses are produced at the output of the voltage comparator 3 as a function of the travel, the width of the said impulses being independent of the voltage prevailing during each voltage comparing process. Via a gate 15, to the second input of which a generator 16 supplying counting pulses of constant frequency is connected, the voltage comparator 3 is followed by a counting device 14, which in the embodiment shown in FIG. 1 comprises a forward and inverse-counting counter. Thus the counting device 14 receives counting pulses from the generator 16 via the gate 15 as long as the square-wave pulse appears at the output of the voltage comparator 3.

In order to determine the indicated output it is necessary to determine at any given time the areas $A_1$ to $A_4$ defined by the pressure curve (illustrated for a four-stroke engine in FIG. 2) and to totalize or subtract same as required. Therefore, the area $A_1$ within the crank-angle range varying from 0 to 180° should first be determined, then the area $A_2$ within the crank-angle range from 180 to 360° should be subtracted therefrom, thereupon the area $A_3$ within the crank-angle range from 360 to 540° and finally, the area $A_4$ within the crank-angle range from 540 to 720°.

This circuitry comprises a second pulse pick-up 18 energized by two additional ferromagnetic laminae 17 mounted on the disk 5 with crank angles of 0° and 180° corresponding to the upper and lower dead center of the engine, and followed by a limiter stage 19 and by a pulse-shaper stage 20 controlling a shifting register 21 on the one hand, and a reducer stage 24 on the other hand. The shifting register 21 which in the embodiment shown comprises five stages, is connected via the output of the first and third stages and via a first AND-gate 26 with the left-hand input of a bistable flip-flop circuit 23 controlling the gate of the gate assembly 15 on the one hand, and via a second AND-gate 27 with the input for forward counting of the counting device 14 on the other hand. The outputs of the second and fourth stages of the shifting register 21, however, are connected with the input for inverse counting of the counting device 14 via a third AND-gate 28. Finally, the fifth stage of the shifting register 21 controls the right-hand input of the bistable flip-flop circuit 23.

The said reducer stage 24 is followed by a selfpositioning switch 25 the left-hand output of which is connected with the first and second AND-gate 26 and 27, whereas its right-hand output is connected with the third AND-gate 28.

As a result, the operation of the control circuit 18 to 28 is as follows: Measurements can be started as soon as the shifting register 21 has been placed into its initial position via its return line 22. Now the pulse pick-up 18 supplies square-wave pulses via the limiter stage 19 and the pulse-shaper stage 20, the first pulse arriving flipping the bistable stage into the left-hand position, provided the gate 26 is conducting. Thus the gate 15 is released for the counting pulses. The mission of the shifting register 21 consists in allowing the counting operation to begin with the upper dead center only, thereby determining proper co-ordination of the counting direction. For the purpose, only every second pulse is allowed to pass via the pulse reducer 24, proper co-ordination being set via the self-positioning switch 25 after the engine has started. At the same time, the second and third AND-gates 27 and 28 for forward and inverse counting are checked by means of this stage 24. Each of the following pulses arriving at the input of the shifting register 21 thus sets the counter alternatingly to forward and inverse counting. The fifth pulse again corresponding to the initial position restores the bistable stage 23 thus terminating the counting operation by locking the gate 15. Another restoration is required to again initiate another counting operation. If the shifting register is of a multistage design, the process can be extended over several revolutions of the engine, in which case the outputs of the first and third stages are to be connected with the outputs of the remaining odd-numbered stages except for the last one and the outputs of the second and fourth stages are to be connected also with the outputs of the remaining even-numbered stages.

In the absence of a forward and inverse-counting counter, two separate counting devices 29 and 30 may be used as shown in FIG. 3, one of them, designated by reference number 29, counting all positive and the other, designated by reference number 30, all negative areas. Subsequently the results are to be subtracted. With this design the counting pulses are additionally supplied via counting-direction checking gates 27 and 28.

I claim:

1. A switching arrangement for the determination of the indicated output of an engine, particularly of a piston-type power engine by integration of the area included in the pressure-and-travel curve of the engine, comprising a circuit section controlled as a function of pressure and consisting of a pressure pick-up, an amplifier following the said pressure-pick-up, a voltage comparator presenting two inputs, the said amplifier being connected with the first input of the said voltage comparator, furthermore consisting of a circuit section controlled as a function of travel and consisting of a rotary disk made of some antimagnetic material, positively connected with the engine to be tested, a number of ferromagnetic laminae being arranged on the circumference of the said disk and distributed thereupon in proportion to the piston travel, an electromagnetic pulse pick-up located in the vicinity of the circumference of the said disk and supplying one impulse each when passing one of the said ferromagnetic laminae, an implitude limiter stage following the said pulse pick-up, a pulse-shaper stage following the said amplitude limiter stage, a monostable stage (single-shot multivibrator) following the said pulse-shaper stage and supplying square-wave pulses, an integrator connected to the said single-shot multivibrator and supplying a saw-tooth voltage with a cutoff of each saw-tooth impulse proportionate to the piston travel, the said integrator being connected with the second input of the said voltage comparator, a gate following the said voltage comparator, said gate having a plurality of inputs, a generator producing counting pulses of constant frequency connected to the second input of the said gate, a counting device following the said gate, furthermore consisting of a circuit section controlling the counting device and comprising two additional ferromagnetic laminae arranged in accordance with the upper and lower dead center of the engine, and opposite each other on the said antimagnetic disk, a second electromagnetic pulse pickup actuated by means of the last-mentioned two ferromagnetic laminae, a second amplitude limiter stage following the said second pulse pickup, a second pulse-shaper stage following the said second amplitude limiter stage, a shifting register and a reducer stage, both of them following the second pulse-shaper stage, a first AND-gate connected to the first and third stages of the said shifting register, a bistable multivibrator stage having left and right hand inputs, the left-hand input of the same being connected with the said first AND-gate, the right-hand input being connected to the last stage of the shifting register, the output of the bistable stage being connected to the gate of the first-mentioned gate assembly, a second AND-gate connected to the first and third stages of the shifting register and connected with the input for forward counting at the said counting device, and a third AND-gate connected to the second and fourth stages of the said shifting register and connected with the input for inverse counting at the said counting device, a self-positioning switch following the said reducer stage, the left-hand output of the said self-positioning switch being connected with the said first AND-gate and with the said second AND-gate, the right-hand output of the self-positioning switch being connected with the said third AND-gate.

2. A switching arrangement as claimed in claim 1, wherein the said couting device comprises two counters, one of them being connected to the said second AND-gate, the other counter being connected to the said third AND-gate, the inputs of both the second and third AND-gate being connected with the output of the first-mentioned gate.

3. A switching arrangement as claimed in claim 1, wherein the said shifting register comprises more than five stages, the outputs of all odd-numeberd stages, except for the last stage being connected with the outputs of the said first and third stages, the outputs of all even-numbered stages being connected with the outputs of the said second and fourth stages of the shifting register.

4. A switching arrangement for the determination of the indicated output of an engine, particularly of a piston-type power engine by integration of the area included in the pressure-and-travel curve of the engine, comprising a pressure pick-up, an amplifier following the same pressure pick-up, a voltage comparator presenting two inputs, the same amplifier being connected with the first input of the said voltage comparator, consisting of a circuit section controlled as a function of travel and consisting of a rotary disk positively connected with the engine to be tested, a number of ferromagnetic laminate being arranged on the circumference of the said disk and distributed thereupon in propagation to the piston travel, an electromagnetic pulse pick-up located in the vicinity of the circumference of the said disk and supplying one impulse each when passing one of the said ferromagnetic laminae, an amplitude limiter stage following the said pulse pick-up, a pulse-shaper stage following the said amplitude limiter stage, a monostable stage (single-shot multivibrator) following the said pulse-shaper stage and supplying square-wave pulses, an integrator connected to the said single-shot multivibrator and supplying a saw-tooth voltage with a cutoff of each saw-tooth impulse proportionate to the piston travel, the said integrator being connected with the second input of the said voltage comparator, a gate following the said voltage comparator, said gate having a plurality of inputs, a generator producing counting pulses of constant frequency connected to the second input of the said gate, a counting device following the said gate, furthermore consisting of a circuit section controlling the counting device and comprising two additional ferromagnetic laminae arranged in accordance with the upper and lower dead center of the engine, and opposite each other on the said antimagnetic disk, a second electromagnetic pulse pick-up actuated by means of the last-mentioned two ferromagnetic laminae, a second amplitude limiter stage following the said second pulse pick-up, a second pulse-shaper stage following the said second amplitude limiter stage, a shifting register and a reducer stage, both of them following the second pulse-shaper stage, a first AND-gate connected to the first and third stages of the said shifting register, a bistable multivibrator stage having left and right hand inputs, the left-hand input of the same being connected with the said first AND-gate, the right-hand input being connected to the last stage of the shifting register, the output of the bistable stage being connected to the gate of the first-mentioned gate assembly, a second AND-gate connected to the first and third stages of the shifting register and connected with the input for forward counting at the said counting device, and a third AND-gate connected to the second and fourth stages of the said shifting register and connected with the input for inverse counting at the said counting device, a self-positioning switch following the said reducer stage, the left-hand output of the said self-positioning switch being connected with the said first AND-gate and with the said second AND-gate.

5. A switching arrangement for the determination of the indicated output of an engine, particularly of a piston-type power engine by integration of the area included in the pressure-and-travel curve of the engine, comprising a pressure pick-up, an amplifier following the said pressure pick-up, a voltage comparator presenting two inputs, the said amplifier being connected with the first input of the said voltage comparator, a rotary disk positively connected with the engine to be tested, a number of ferromagnetic laminae being arranged on the circumference of the said disk and distributed thereupon in proportion to the piston travel, an electro-magnetic pulse pick-up located in the vicinity of the circumference of the said disk and supplying one impulse each when passing one of the said ferromagnetic laminae, an amplitude limiter stage following the said pulse pick-up, a pulse-shaper stage following the said amplitude limiter stage, a monostable stage (single-shot multivibrator) following the said pulse-shaper stage and suppplying square-wave pulses, an integrator connected to the said single-shot multivibrator and supplying a saw-tooth voltage with a cutoff of each saw-tooth impulse proportionate to the piston travel, the said integrator being connected with the second input of the said voltage comparator, a gate following the said voltage comparator, said gate having a plurality of inputs, a generator producing counting pulses of constant frequency connected to the second input of the said gate, a counting device following the said gate, furthermore consisting of a circuit section controlling the counting device and comprising two additional ferromagnetic laminae arranged in accordance with the upper and lower dead center of the engine, and opposite each other on the said antimagnetic disk, a second electromagnetic pulse pick-up actuated by means of the last-mentioned two ferromagnetic laminae, a second amplitude limiter stage following the said second pulse pick-up, a second pulse-shaper stage following the said second amplitude limiter stage, a shifting register and a reducer stage, both of them following the second pulse-shaper stage, a first AND-gate connected to the first and third stages of the said shifting register, a bistable multivibrator stage having left and right hand inputs, the left-hand input of the same being connected with the said first AND-gate, the right-hand input being connected to the last stage of the shifting register, the output of the bistable stage being connected to the gate of the first-mentioned gate assembly, a second AND-gate connected to the first and third stages of the shifting register and connected with the input for forward counting at the said counting device, and a third AND-gate connected to the second and fourth stages of the said shifting register and connected with the input for inverse counting at the said counting device, a self-positioning switch following the said reducer stage, the left-hand output of the said self-positioning switch being connected with the said first AND-gate and with the said second AND-gate.

References Cited

UNITED STATES PATENTS 2,349,560 5/1944 Reijnst -------------- 73—115

2,817,966 12/1957 Wright et al. -------- 73—116

2,919,576 1/1960 Weller et al. -------- 73—115

RICHARD C. QUEISSER, *Primary Examiner.*

JAMES J. GILL, *Examiner.*

J. W. MYRACLE, *Assistant Examiner.*